122,623

UNITED STATES PATENT OFFICE.

ADOLPH MAHLER, OF NEW YORK, N. Y.

IMPROVEMENT IN COMPOSITIONS FOR LINING WATER-COOLERS, &c.

Specification forming part of Letters Patent No. 122,623, dated January 9, 1872.

SPECIFICATION.

*To all whom it may concern:*

Be it known that I, ADOLPH MAHLER, of New York, in the county of New York and State of New York, have invented a new and useful Composition for Lining Water Coolers, Refrigerators, Ice Houses, &c.; and I do hereby declare that the following is a full, clear, and exact description thereof.

My invention consists in the use of peat, a portion of which is made into charcoal and then mixed with the crude peat, and either formed into blocks or slabs, or filled in and pressed down compactly between the inner and outer walls of the water-cooler, refrigerator, or other vessel to which it is applied, forming a perfect non-conductor of heat. For ice-houses the walls are filled in as above described, and the roof may be formed of blocks or slabs protected above and below by boards.

What I claim as new, and desire to secure by Letters Patent, is—

A composition for lining water-coolers, refrigerators, &c., consisting of a mixture of crude peat and peat charcoal, as herein described, for the purpose specified.

ADOLPH MAHLER.

Witnesses:
C. A. HINCKLEY,
W. WESTERVELT.

(35)